US012380819B2

(12) United States Patent
Park

(10) Patent No.: US 12,380,819 B2
(45) Date of Patent: Aug. 5, 2025

(54) METHOD AND APPARATUS FOR STABILIZING IMAGE DISPLAY

(71) Applicant: HYUNDAI MOBIS CO., LTD., Seoul (KR)

(72) Inventor: Kyung Yong Park, Yongin-si (KR)

(73) Assignee: HYNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/496,814

(22) Filed: Oct. 27, 2023

(65) Prior Publication Data

US 2024/0144846 A1 May 2, 2024

(30) Foreign Application Priority Data

Oct. 28, 2022 (KR) ........................ 10-2022-0141035

(51) Int. Cl.
*G09G 3/00* (2006.01)
*G09G 3/34* (2006.01)

(52) U.S. Cl.
CPC ........... *G09G 3/002* (2013.01); *G09G 3/3406* (2013.01); *G09G 2330/12* (2013.01); *G09G 2340/0471* (2013.01); *G09G 2370/22* (2013.01); *G09G 2380/10* (2013.01)

(58) Field of Classification Search
CPC ..................... G09G 3/3406; G09G 2310/0237
See application file for complete search history.

(56) References Cited

U.S. PATENT DOCUMENTS

2008/0088562 A1* 4/2008 Park ..................... G09G 3/3648 345/92
2009/0167573 A1* 7/2009 Kim ....................... H03K 5/135 341/100
2011/0254468 A1* 10/2011 Chen ...................... H05B 45/38 315/307
2012/0026139 A1* 2/2012 Chou ................... G09G 3/3406 345/207
2012/0323394 A1* 12/2012 Gandhi ................ H04N 1/0097 700/297
2014/0160176 A1* 6/2014 Nose .................... G09G 3/3685 345/102
2015/0098029 A1* 4/2015 Sato .................. G02F 1/133555 349/11
2016/0019846 A1* 1/2016 Kim ..................... G09G 3/3406 345/690

(Continued)

*Primary Examiner* — William Boddie
*Assistant Examiner* — Bipin Gyawali
(74) *Attorney, Agent, or Firm* — DLA PIPER LLP US

(57) ABSTRACT

A HUD system includes a master configured to generate a height change signal for a HUD image and transmit the height change signal; a slave configured to receive the height change signal from the master and adjust a height of the HUD image according to the height change signal; and a connection device configured to connect the master to the slave, wherein the slave drives a motor configured to adjust the height of the HUD image when the slave receives the height change signal, and responds to the master through reflection of a stopped state during movement or a movement amount excess state of the motor to notify the master of a malfunction of the motor when driving of the motor is completed, and the master requests the slave to reset a position of the motor in response to the response of the slave.

14 Claims, 6 Drawing Sheets

(56) References Cited

U.S. PATENT DOCUMENTS

| | | | | |
|---|---|---|---|---|
| 2016/0063688 | A1* | 3/2016 | Yang | G09G 3/3426<br>345/589 |
| 2019/0377400 | A1* | 12/2019 | Zhang | H04M 1/72454 |
| 2021/0081159 | A1* | 3/2021 | Kaneko | G06F 3/1446 |
| 2021/0398497 | A1* | 12/2021 | Qiu | G09G 3/3406 |
| 2022/0093061 | A1* | 3/2022 | Liu | G09G 5/006 |
| 2023/0081458 | A1* | 3/2023 | Chen | G09G 3/3406<br>345/691 |

* cited by examiner

METHOD AND APPARATUS FOR STABILIZING IMAGE DISPLAY

CROSS-REFERENCE TO RELATED APPLICATION

This application claims the benefit of priority to Korean Patent Application No. 10-2022-0141035, filed in the Korean Intellectual Property Office on Oct. 28, 2022, the entire contents of which are incorporated herein by reference.

TECHNICAL FIELD

The present disclosure relates to a method and device for stabilizing an image display, and more particularly, to a method and device for stabilizing an unstable image display due to separation of functions into a master device and a slave device in a head-up display (HUD) device and system using I2C communication.

BACKGROUND

The content to be described below merely provides background information related to the present embodiment and does not constitute related art.

A head-up display (HUD) is a device that displays vehicle information (for example, speed, map, and instrument information) in a field of view of a driver, and assists safe driving by improving concentration on forward gaze of the driver.

Meanwhile, I2C communication is a bidirectional two-wire serial bus that provides a communication link between a plurality of devices, and is used to connect low-speed peripheral devices in an embedded system, a mobile phone, or the like. In a I2C communication scheme, one master device and one or more slave devices are used.

A current HUD system is of a function segregation type, and each component thereof is developed by each manufacturer. In the master, warping/image processing and image transmission are performed. In the slave, LED backlight lighting, image height and brightness adjustment, communication response to a master request, and the like are performed. Each component exchanges information in an I2C communication scheme. Since I2C transmits serial data, a system that communicates in the I2C scheme includes a SER/DES configuration. SER/DES is an abbreviation for SERializer and DESerializer. SER is a device that converts a parallel signal into a serial signal, and DES is a device that converts a serial signal into a parallel signal. With SER/DES, a low-speed parallel signal is converted to a high-speed serial signal at a transmitting stage, the high-speed serial signal passes through a transmission medium (for example, an optical cable or copper wire), and then, the high-speed serial signal is converted back to the low-speed parallel signal at a receiving stage.

In a process in which each of the master and the slave processes an operation for providing a HUD image, mismatch in operation synchronization may occur between the master and the slave due to an abnormality in an SER/DES setting or initialization of the SER/DES setting. In this case, a problem in which a display of the HUD image is failed occurs. A cause of such mismatch in operation synchronization may exist in each of the master, the slave, or the connection device.

In particular, malfunction is likely to occur due to a surrounding environment and elements during an operation of SER/DES in high-speed transmission. When such a problem occurs, the stability of transmission cannot be guaranteed.

SUMMARY

An object of the present disclosure is to provide a method and device allowing a HUD image to be stably displayed by taking advance measures against a problem in which a display of the HUD image may be failed in a most important image setting portion when a HUD system is booted.

Since the problem of failing in displaying the HUD image may occur in each of a master, a slave, and a connection device connecting these, the master guarantees SER/DES setting stabilization and an SER/DES connection, and the slave guarantees normal operations of a HUD image height adjustment motor and LED backlight driving, thereby preventing operation synchronization mismatch between the master and the slave and a malfunction due to a surrounding environment and elements.

In an aspect of the present application, a HUD system is provided. The HUD system includes a master configured to generate a height change signal for a HUD image and transmit the height change signal; a slave configured to receive the height change signal from the master and adjust a height of the HUD image according to the height change signal; and a connection device configured to connect the master to the slave, wherein the slave drives a motor configured to adjust the height of the HUD image when the slave receives the height change signal, and responds to the master through reflection of a stopped state during movement or a movement amount excess state of the motor to notify the master of a malfunction of the motor when driving of the motor is completed, and the master requests the slave to reset a position of the motor in response to the response of the slave.

In an aspect of the present application, a HUD system is provided. The HUD system includes a master configured to generate a backlight turn-on or turn-off signal for generating a HUD image and transmits the turn-on or turn-off signal; a slave configured to receive the turn-on or turn-off signal from the master and provide the backlight by driving an LED according to the turn-on or turn-off signal; and a connection device configured to connect the master to the slave, wherein the slave drives the LED when receiving a request to turn on or turn off the backlight, and responds to the master through reflection of a turn-on or turn-off state of the LED to notify the master of the backlight state, and the master confirms the backlight state, and requests the slave to turn on or turn off when the backlight state does not match the backlight turn-on or turn-off signal.

In another aspect of the present application, an image display stabilization method of a function-separated HUD system is provided. The method includes steps of transmitting, by a master, a HUD image height change signal; receiving, by a slave, the HUD image height change request, and driving a motor for adjusting the height of the HUD image; responding to the master through reflection of a stopped state during movement or a movement amount excess state of the motor to notify the master of a failure of the motor; and requesting, by the master, the slave to reset the motor position in response to the response from the slave.

In another aspect of the present application, an image display stabilization method of a function-separated HUD system is provided. The method includes steps of: transmitting, by a master, a request to turn on or turn off a backlight for a HUD image display; turning on or off, by a slave, an LED providing the backlight through an LED driver when receiving the request; responding, by the slave, to the master through reflection of an on or off state of the LED to notify the master of a backlight state; and requesting, by the master, the slave to turn on or off when the backlight state does not match the request to turn on or off the backlight.

According to various embodiments of the present specification, it is possible to improve traveling convenience for a driver by confirming a point at which a problem that a display of a HUD image fails may occur, and taking advance measures to provide a stable HUD image to the driver.

More specifically, in a HUD system communicating using an I2C scheme, it is possible to prevent operation synchronization mismatch between the master and the slave and a malfunction due to a surrounding environment and elements by guaranteeing the integrity of the SER/DES setting, motor driving, and backlight driving of the slave.

The effects of the present disclosure are not limited to the effects mentioned above, and other effects not mentioned will be clearly understood by those skilled in the art from the description below.

DETAILED DESCRIPTION

Figure 8A:
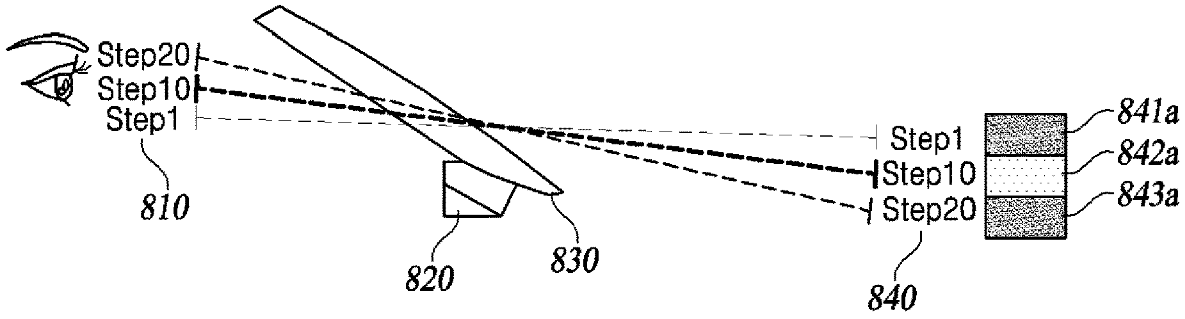

FIG. 8*a* is a diagram illustrating a right side of a vehicle in which a HUD system according to an embodiment of the present disclosure is installed.

Figure 8B:
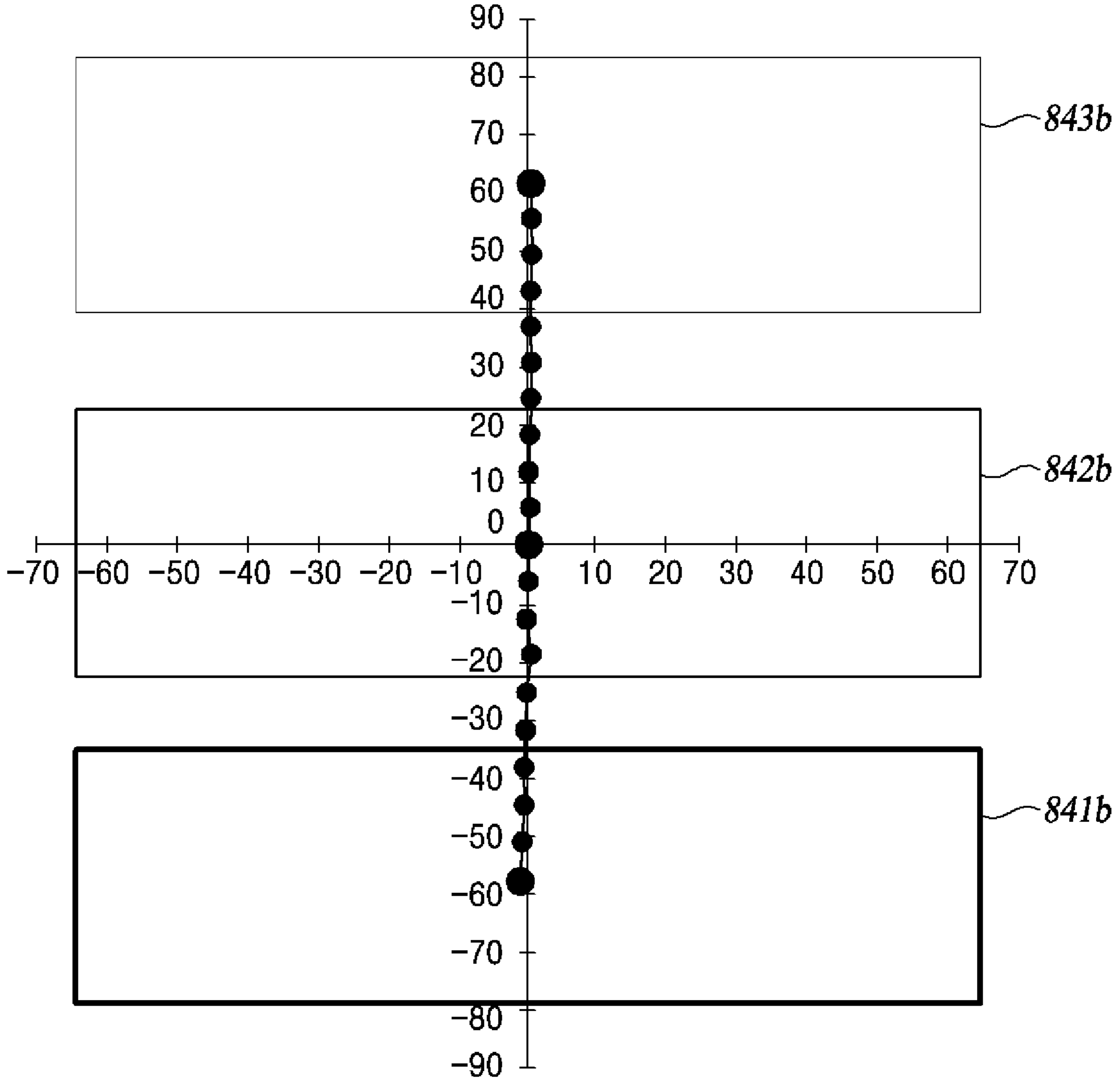

FIG. 8*b* illustrates a display area of a HUD image that can be perceived by a driver according to a degree of driving of a motor in correspondence to FIG. 8*a*.

DETAILED DESCRIPTION

Hereinafter, embodiments of the present disclosure are described in detail with reference to the accompanying drawings. In the following description, like reference numerals designate like elements, although the elements may be shown in different drawings. Further, in the following description, where it has been considered that a specific a description of well-known features, functions, or configurations may obscure the gist of the present disclosure, a detailed description thereof has been omitted for the purpose of clarity and brevity.

When a component, device, element, or the like of the present disclosure is described as having a purpose or performing an operation, function, or the like, the component, device, or element should be considered herein as being "configured to" meet that purpose or perform that operation or function.

Configuration of the Invention

A HUD system according to the embodiment includes a master, a slave and a connection device.

The master may be configured of a micro controller unit (MCU), an application processor (AP), an interrupt controller, a SRAM buffer, a transmission and reception buffer, and a SERializer (SER).

The MCU performs a SER/DES setting to set each controller and communication data channel for HUD image transmission and display. The MCU is electrically connected to the SRAM buffer, and SER/DES setting data generated by the MCU is moved to the SRAM buffer and stored therein. That is, original SER/DES setting data ("original data") is stored in the SRAM buffer.

The AP processes and outputs the HUD image and requests the slave to turn on/off a LCD and change a height of the HUD image.

The interrupt controller is electrically connected to the SRAM buffer and the transmission and reception buffer. The original data stored in the SRAM buffer is transmitted to the interrupt controller. The interrupt controller transmits data to be transmitted to the slave to the transmission and reception buffer according to a priority of the interrupt service routine (ISR). Therefore, SER/DES setting data ("output data") is stored in the transmission and reception buffer.

SER is electrically connected to the transmission and reception buffer. SER is a serializer that receives output data configured in parallel from the transmission and reception buffer, converts the output data into serial data, and transmits the serial data to the slave using an I2C scheme through the connection device connected to the slave.

The slave is configured of a DES (DESerializer), a micro computer, an LED driver, an LED, a motor driver, a motor, and an LCD.

DES is a deserializer that converts serial data transmitted from the master through the connector into parallel data.

The microcomputer is a central processing unit that controls each component of the slave. The microcomputer is electrically connected to the DES, receives and processes a request from the master, and transmits a control command to each component electrically connected to the microcomputer.

The LCD is electrically connected to the DES and the microcomputer. The LCD receives image data processed and output by the AP of the master from the DES, and displays the image data under the control of the microcomputer.

The LED is a light source for generating the HUD image to be displayed on a windshield of the vehicle, and corresponds to a Picture Generation Unit (PGU) of the HUD system. The LED creates back light that is projected onto an image displayed by the LCD. Accordingly, the HUD image to be displayed on the windshield is generated. The generated HUD image is subjected to a series of reflection processes and is incident on the windshield of the vehicle so that the driver can recognize the HUD image.

The LED driver drives on/off of each of pixels constituting the LED (or opens and closes a shutter of each pixel) on the basis of a display area and position information of the HUD image to be displayed on the windshield under the control of the microcomputer.

The motor is connected to a mirror that reflects the HUD image generated by the LED. When the motor rotates, an angle of the mirror is adjusted so that an incidence angle of the HUD image incident on the windshield is changed, and a height of a HUD image display area recognizable by the driver is adjusted.

The motor driver drives the motor on the basis of height information of the HUD image to be displayed on the windshield under the control of the microcomputer.

Stabilization of SER/DES Setting

As described above, the integrity of the SER/DES setting should be guaranteed in the MCU so that the image in the CPU can be stably displayed on the slave. However, it has been confirmed that the SER/DES setting is intermittently incorrectly performed differently than intended. The incorrect setting of the intended SER/DES setting can occur in the following three cases. (1) Incorrect setting due to data contamination inside the master at a stage prior to communication with the slave, (2) incorrect setting due to a communication problem at a stage of communication with the slave, and (3) incorrect setting due to unconfirmed causes (that is, unexpected causes according to disturbance or the like). Hereinafter, solutions to the causes of the incorrect setting are disclosed.

Incorrect Setting Due to Data Contamination (Before Communication Occurs)

In the stage prior to communication with the slave, the incorrect SER/DES setting due to data contamination inside the master may occur when output data is contaminated according to an Interrupt Service Routine (ISR) operation of the interrupt controller. The contamination of the output data means that the output data mismatches the original data. The contamination of the output data is likely to cause an image display problem.

It is possible to solve the problem of the incorrect SER/DES setting due to the contamination of output data by confirming whether the original data matches the output data. When a STOP state is confirmed in a transmission data frame, it is confirmed whether the original data matches the output data. The STOP state is a most stable section of bus release from the end of one communication to the start of the next communication and is a point in time at which output data is transmitted and communication is ended. In the STOP state, it is possible to check whether or not the original data matches the output data.

When data mismatch is confirmed, retransmission is performed on the mismatch data. In this case, an ISR having a higher priority than I2C is set to disable so that output data that does not match the original data can be preferentially retransmitted. When it is confirmed that the retransmitted output data matches the original data, the ISR set to disable is reset to enable. The retransmission process may be repeated until the AP outputs the image for the first time. For example, retransmissions may be performed up to three times. When the mismatch between the data exceeds three times, the retransmission is stopped and the next data is processed.

Incorrect Setting Due to Communication Problem (Communication Problem)

As a communication problem occurs in a step of communicating with the slave, the SER/DES setting may be incorrect.

In error handling due to the communication problem, first, it is confirmed whether the connection device is physically connected. When the connection device is not connected normally, this is a physical failure, and thus, the failure is recorded and OBD (On Board Diagnostics) is notified of the failure via DTC (Diagnostic Trouble Codes) so that the driver is notified of an abnormality in the connection device.

When the connection device is normal, a determination is made as to whether or not there is a communication error. A process of confirming whether or not there is a communication error includes a process of confirming arbitration and a bit error in a communication data frame. When a communication error is confirmed for a preset period of time or more and detected, the I2C block is initialized and the SER/DES setting is performed again from the beginning. The preset period of time may be, for example, 300 ms. When vehicle power is supplied (IGN ON), an AP image output is performed within 4.2 seconds from an IGN ON point in time, and the SER/DES setting in the MCU start about one second after the IGN ON point in time. Since this process should end before the image is output from the AP, for example, the process may be limited to three times. When the communication error is detected more than four times, only the SER initialization is performed, the SER/DES setting is performed again on all pieces of data, and then, a SER/DES setting error handling process ends.

Incorrect Setting Due to Unconfirmed Causes (Unknown Causes Due to Disturbance, or the Like)

An SER/DES setting error may occur in a communication process between the master and the slave due to various unexpected causes such as disturbance. In this case, a problem arises in that DES on the slave side is set differently from the DES setting intended on the master side. When a vehicle cluster image and the HUD image are output together, a display of the cluster image may also fail due to a problem with the HUD image.

When the SER/DES setting error handling ends in the master, it is confirmed whether or not the DES setting data matches an actual DES setting. When mismatch between the DES setting data and the actual DES setting is confirmed, the DES setting is performed. A DES configuration is present in the slave, but the slave uses a pass-through communication channel, and thus, the slave cannot access the DES. Therefore, the DES setting is performed in the master. The DES setting is done only once. That is, when the DES setting data does not match the actual DES setting even after the DES setting, a failure is recorded and the next step is performed. This makes it possible to prevent a problem that a display of the cluster image also falls due to the HUD image problem.

Case in which there is Problem with I2C Communication

In the connection device connecting the master to the slave, an I2C backchannel communication channel and an image channel are separated. Therefore, even when a problem occurs in the I2C communication, a HUD image display is possible when there is no problem in the AP and the connection device. However, a problem that, when a problem occurs in the I2C communication, image output disabled (Video Visible: False) is set as a specification in the AP, a black image is output, and a display of an actual image fails has been confirmed. Further, the image output enabled/disabled setting state (Video Visible: True/False) is likely to be changed due to other unconfirmed causes.

When a problem occurs in the I2C communication, it is first confirmed whether or not there is a problem with the AP and/or the connection device, and when there is no problem with the AP and/or the connection device, an image output enabled/disabled setting state is changed from image output disabled (Video Visible: False) to image output enabled (Video Visible: True), thereby solving a problem of failing in displaying the HUD image. The AP continuously monitors the image output enabled/disabled setting state, and changes the image output enabled/disabled setting state to image output enabled (Video Visible: True) when the image output enabled/disabled setting state is image output disabled (Video Visible: False) in a HUD operation state.

Slave Control

The master outputs the image normally since there is no problem in SER/DES setting, but there is a problem that a display of the image fails due to a problem on the slave side. Failing in displaying the image due to the problem on the slave side can occur in the following two cases. (1) a case in which there is a problem with motor height control of the slave, and (2) a case in which a problem occurs in backlight control of the slave. Hereinafter, solutions to these problems are disclosed.

Slave Motor Height Control Problem

When power is applied to the slave, an operation (ZPD: Zero Point Detection) is performed to set an initial reference position of a slave motor. When the motor is locked at a point in time of ZPD operation and the ZPD operation is not completed, the motor is located lower than the reference position. This problem may occur when an abnormality occurs in a ZPD switch contact point due to freezing. Alternatively, even when the ZPD operation is completed, the motor may be located higher or lower than the reference position because a movement amount of the motor is incorrectly set. When the motor is located higher or lower than the reference position, a problem of a deviation from a position of an eye-box that can be seen by the driver occurs.

The slave responds to the master through reflection of a stopped state during movement and a state in which a movement amount is exceeded, to notify the master of a malfunction of the motor. The master requests the slave to initialize the position of the motor when the time is before a first image output. The slave boots within 500 ms after power (IGN/B+) is applied. Since the end should be made before an image is output in the AP, for example, the initialization request can be made up to five times. When the malfunction of the motor exceeds five times, the failure is recorded and the OBD is notified of the failure via the DTC so that the driver is notified that the slave needs to be replaced.

Slave Backlight Control Problem

The problem of failing in displaying the HUD image may also occur when a problem occurs in slave motor control as well as slave backlight control. When the slave turns off the backlight even though the master requests to turn on the backlight, the image is not displayed. On the other hand, when the slave performs a turn-on operation even though the master requests to turn off the backlight, only a white image is displayed.

When the master requests to turn on/off the backlight, the slave responds with whether the backlight is turned on/off, and the master checks a backlight state from the response of the slave and requests to turn on/off repeatedly. When the master detects that the backlight driving element, that is, the LED driver is disabled, the master records the failure and notifies the OBD of the failure via the DTC so that the driver is notified that the slave needs to be replaced.

Figure 1:
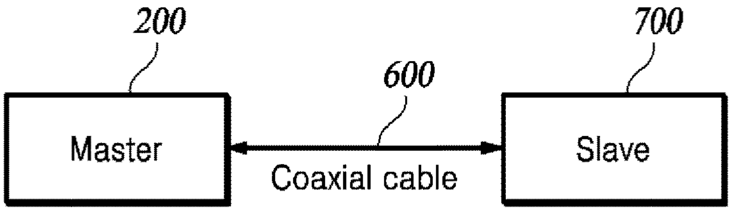
FIG. 1 is an exemplary configuration diagram of a function-separated HUD device communicating in an I2C scheme.

FIG. 1 illustrates an exemplary configuration of a function-separated HUD system communicating in an I2C scheme. The HUD system according to an embodiment of the present specification includes a master 200, a slave 700, and a coaxial cable 600 that connects the master 200 to the slave 700. Although not illustrated in FIG. 1, the master 200 and the slave 700 may be connected to a plurality of other slaves. Hereinafter, a more detailed configuration of the master 200, the slave 700, and the coaxial cable 600 and a HUD image stabilization method will be described.

Figure 2:
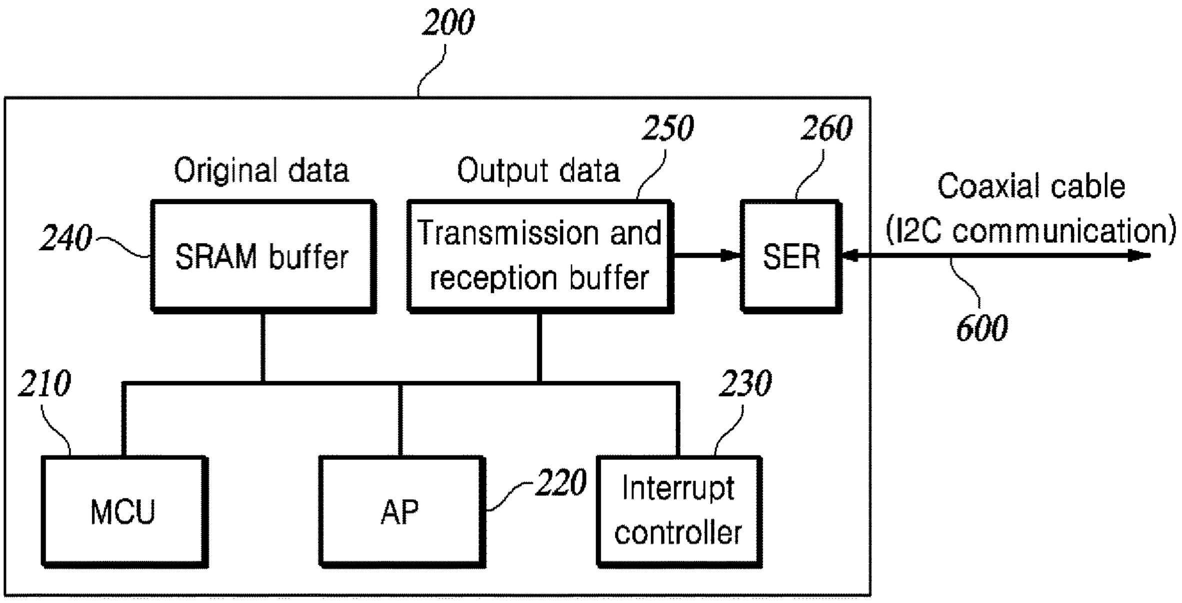
FIG. 2 is a configuration diagram illustrating each component of a master according to an embodiment of the present disclosure.

FIG. 2 illustrates a more detailed exemplary configuration of the master 200. As illustrated in FIG. 2, the master 200 includes an MCU (210, Micro Controller Unit), an AP (220, Application Processor), an interrupt controller 230, an SRAM buffer 240, a transmission and reception buffer 250, and a SER (260, SERializer).

The MCU 210 performs SER/DES setting to set, for example, each controller and communication data channel for HUD image transmission and display. SER/DES setting data generated by the MCU 210 is moved to the SRAM buffer 240 and stored therein. The SER/DES setting data stored in the SRAM buffer 240 will be referred to as original data hereinafter.

The AP 220 processes and outputs the HUD image and requests the slave 700 to turn on/off the LCD and change the height of the HUD image.

The interrupt controller 230 receives the original data stored in the SRAM buffer 240 and transmits the original data to the transmission and reception buffer 250 according to an ISR priority. Data stored in the transmission and reception buffer 250 will be referred to as output data hereinafter.

The SER 260 receives the output data from the transmission and reception buffer 250, converts the output data that is parallel data into serial data, and transmits the serial data to the slave 700 using an I2C scheme through the coaxial cable 600.

Figure 3:
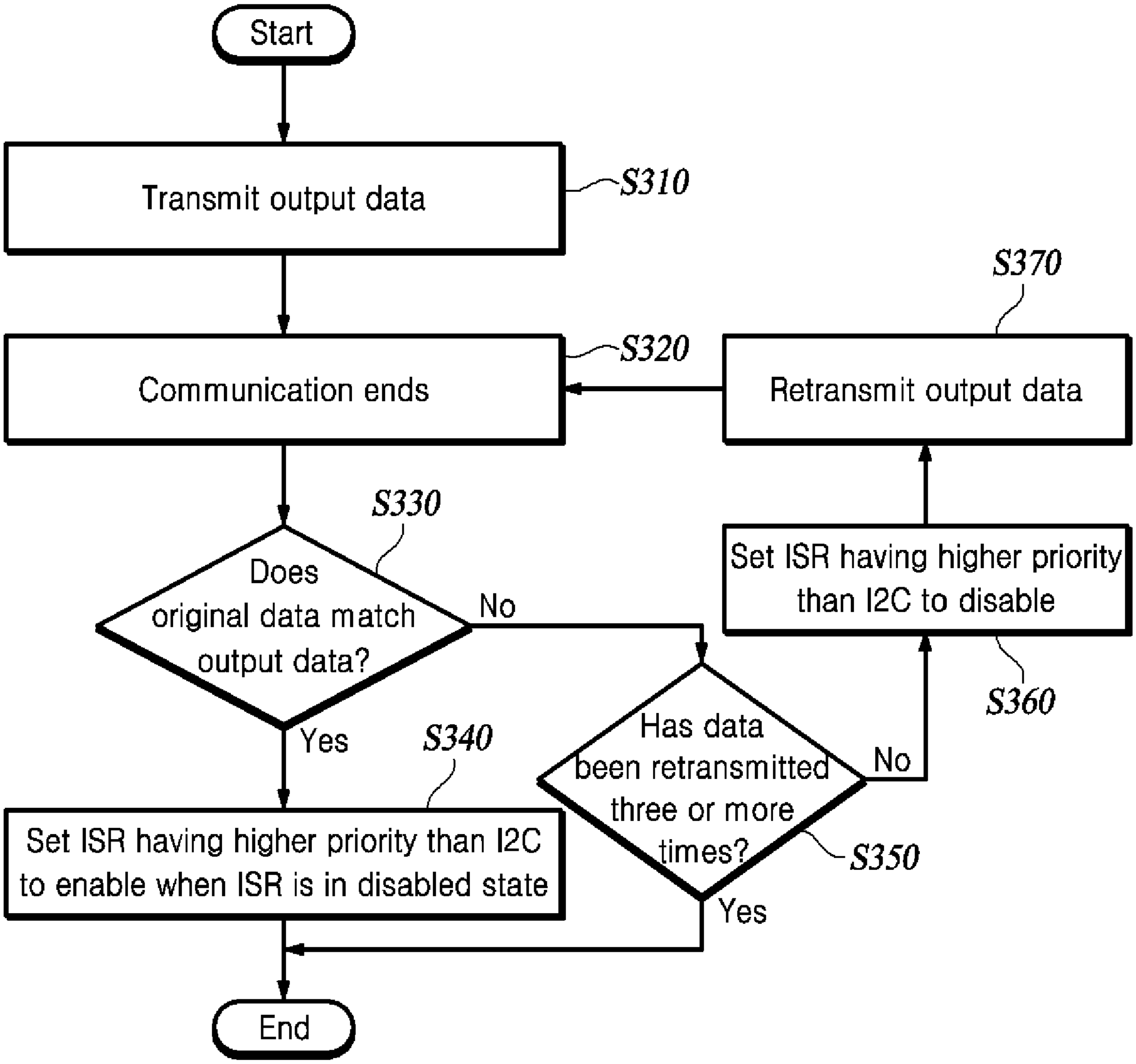
FIG. 3 is a flowchart illustrating a process of stabilizing an SER/DES setting when data contamination occurs in the master in a step before the master communicates with a slave according to an embodiment of the present disclosure.

FIG. 3 is a flowchart illustrating a process of preventing an SER/DES setting error due to data contamination inside the master 200 in a step before the master 200 communicates with the slave 700.

In the stage before communication with the slave 700, the incorrect SER/DES setting due to data contamination inside the master 200 may occur due to contamination of the output data according to, for example, an ISR (interrupt service routine) operation of the interrupt controller 230. The contamination of the output data means that the original data stored in the SRAM buffer 240 and the output data of the transmission and reception buffer 250 do not match. The contamination of the output data may cause an image display problem.

Referring to FIG. 3, a method of preventing contamination of the output data inside the master 200 according to the embodiment of the present disclosure includes the following process. First, SER/DES setting data is transmitted from the master 200 to the slave 700 (S310). It is confirmed whether a transmission protocol is in a STOP state in order to perform a procedure in a most stable section of bus release from an end point of one communication to the start of next communication (S320). Next, it is confirmed whether the original data of the SRAM buffer 240 matches the output data of the transmission and reception buffer 250 (S330).

When the original data mismatches the output data, the output data is retransmitted, and the retransmission may be limited to a preset number of times. In the embodiment of FIG. 3, it is confirmed whether the SER/DES setting data has been retransmitted three or more times (S350). When the retransmission is performed less than three times, the ISR that has a higher priority than the I2C communication is set to disable in order to prevent the SER/DES setting error due to the interrupt controller 230 (S360), and the output data is retransmitted (S370). Returning to the process of confirming whether the communication ends again (S320), when the STOP state of the transmission protocol is confirmed, it is confirmed whether the original data matches the output data (S330).

When the original data of the SRAM buffer 240 matches the output data of the transmission and reception buffer 250, the processing proceeds to step S340. When the ISR having a higher priority than the I2C communication is changed to a disabled state through step S360, an original state is set to enable (S340).

Figure 4:
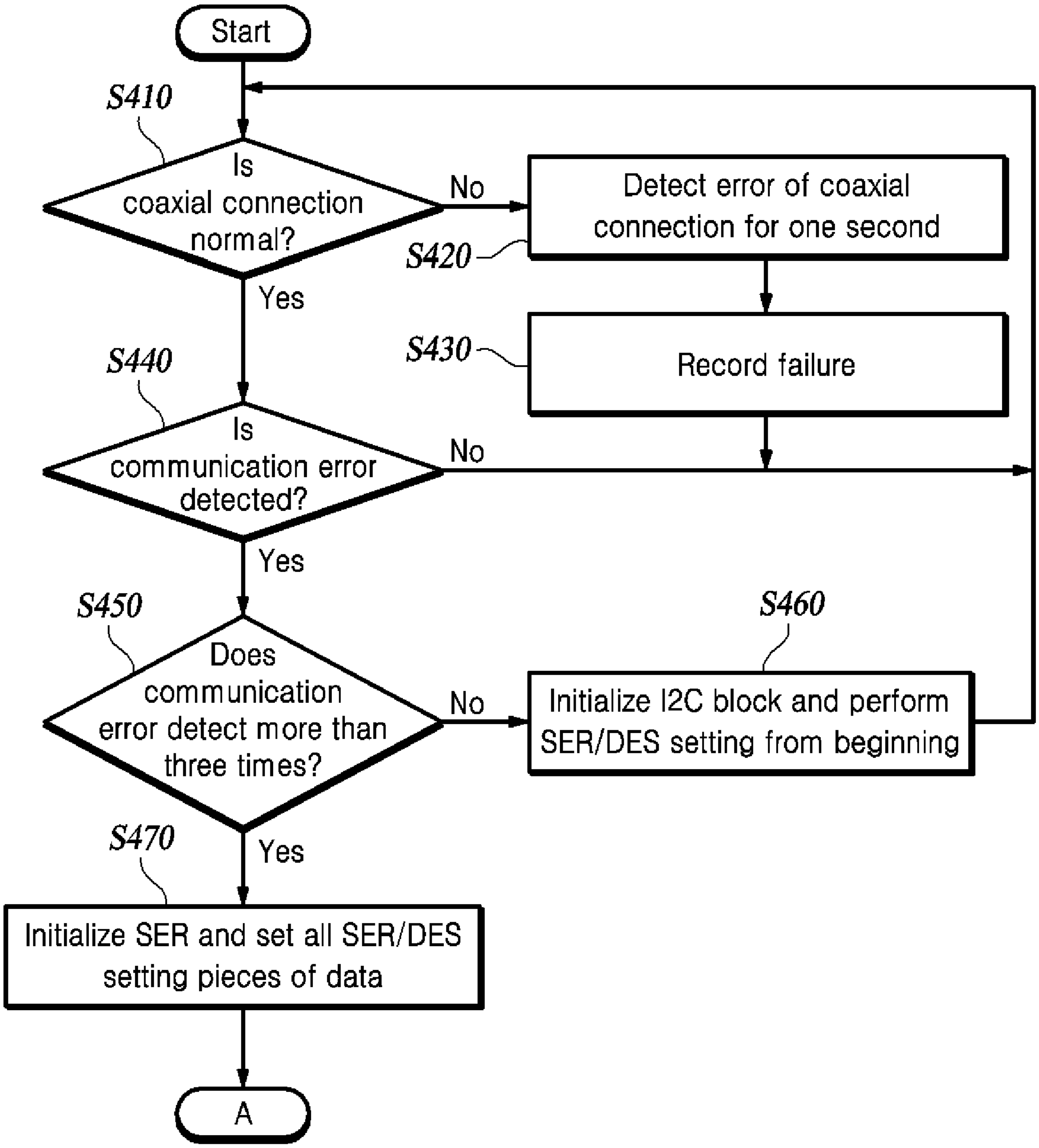
FIG. 4 is a flowchart illustrating a process of stabilizing an SER/DES setting when a communication problem between the master and the slave occurs according to an embodiment of the present disclosure.

FIG. 4 is a flowchart illustrating a process of preventing an incorrect SER/DES setting due to a communication problem occurring in a process in which the master 200 communicates with the slave 700.

Referring to FIG. 4, a method of handling an error of an incorrect SER/DES setting includes the following process. First, it is confirmed whether or not the connection of the coaxial cable 600 connecting the master 200 to the slave 700 is normal (S410). When the coaxial cable 600 is not normally connected, this is a physical failure, and thus, the failure is recorded, and the on board diagnostics (OBD) is notified of the failure via DTC (Diagnostics Trouble Codes) so that the driver is notified of an abnormality in the coaxial cable 600 (S430).

When the coaxial cable 600 is normal, the presence or absence of the communication error is checked (S440). The process of checking whether there is a communication error necessarily includes a process of confirming arbitration and bit error in a communication data frame. When the communication error is maintained for more than 300 ms, it is checked whether the occurrence of the communication error exceeds a preset number of times (S450). When power is supplied to the vehicle (IGN ON), an image output of the AP 220 is performed within 4.2 seconds from an IGN ON point in time, and the SER/DES setting in the MCU 210 starts about one second after IGN ON. In order to complete the SER/DES setting before the image is output, it is necessary to limit a coping with occurrence of a communication error to a preset number of times. In the embodiment of FIG. 4, step S460 is performed only when communication errors are detected three times or less.

When the communication error is detected three times or less, the I2C block is initialized and the SER/DES setting is performed again from the beginning (S460). When the communication error is detected more than three times, only SER initialization is performed and the SER/DES setting is performed again for all pieces of data (S470). When the process S470 is completed, the SER/DES setting error handling ends (A).

Figure 5:
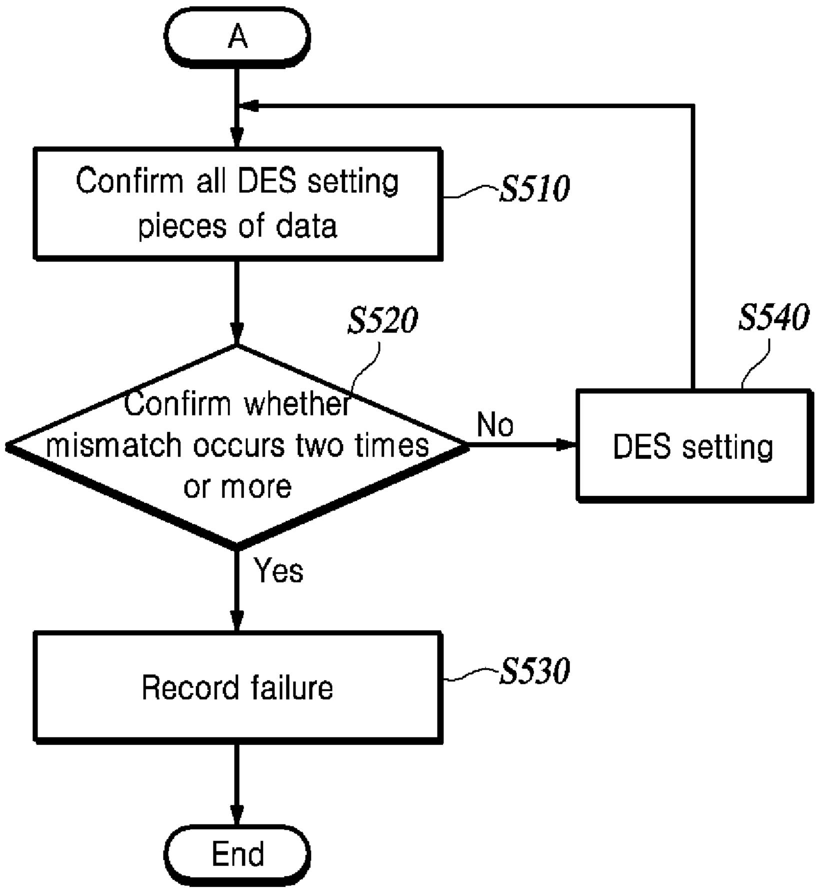
FIG. 5 is a flowchart illustrating a process of stabilizing the SER/DES setting when an unconfirmed disturbance occurs at the time of the SER/DES setting according to an embodiment of the present disclosure.

FIG. 5 is a flowchart illustrating a process of preventing an incorrect SER/DES setting that occurs during communication between the master 200 and the slave 700 due to various causes other than causes of the SER/DES setting error occurrence described above.

The SER/DES setting error may occur in the communication process between the master 200 and the slave 700 due to various unexpected causes such as disturbance. In this case, when the DES on the slave 700 side is set differently from the DES setting intended on the master 200 side, a display of the cluster image may also fail due to a problem with the HUD image in a case in which the vehicle cluster image and the HUD image are output together.

Referring to FIG. 5, after the SER/DES setting error handling illustrated in FIG. 4 is ended (A), a process of preventing the incorrect SER/DES setting due to other causes starts. Since the transmission of all SER/DES setting data has been completed, whether the DES setting data of the slave 700 matches the DES setting data transmitted from the master 200 is confirmed for all DES setting pieces of data (S510).

When mismatch between the pieces of data is confirmed for the first time (S520), the DES setting is performed (S540). The DES setting is performed in the master 200. As will be described below, the DES 710 is present in the slave 700, but the slave 700 uses a pass-through communication channel, and thus, the slave 700 cannot access the DES 710. Therefore, DES setting should be performed in the master 200.

The DES setting is performed only once. That is, when mismatch between the DES setting data transmitted from the master 200 and the actual DES setting is confirmed even after the DES setting (S540), the processing proceeds to step S530 (S520). When a failure is recorded (S530), an SER/DES setting stabilization procedure ends and the next step is performed.

Figure 6:
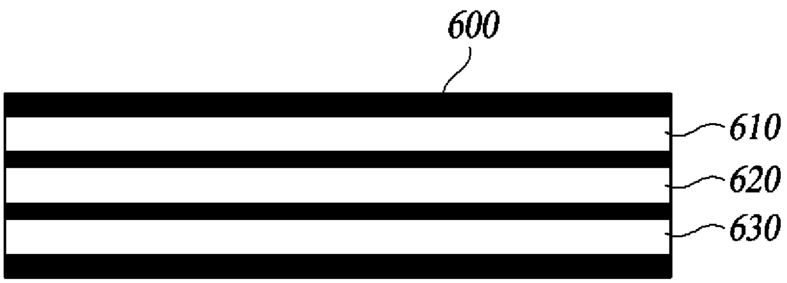
FIG. 6 is a view schematically illustrating a cross section of a connection device according to an embodiment of the present disclosure.

FIG. 6 is a cross-sectional view schematically illustrating a cross section of the coaxial cable 600. The coaxial cable 600 includes an I2C backchannel communication channel 610, an image channel 620, and a GPIO 630.

As illustrated in FIG. 6, since the I2C backchannel communication channel 610 and the image channel 620 are separated in the coaxial cable 600 connecting the master 200 to the slave 700, a HUD image display is possible when there is no problem with the AP 220 and the coaxial cable 600 even when a problem occurs in I2C communication. However, there is a problem that, when a problem occurs in the I2C communication, image output disabled (Video Visible: False) is set as a specification in the AP 220, a black image is output, and a display of an actual image fails. In addition, the image output enabled/disabled setting state (Video Visible: True/False) is likely to be changed to image output disabled (Video Visible: False) due to other unconfirmed causes.

As described in FIG. 5, when a problem occurs in the I2C communication, the failure is recorded in the process S530, and the SER/DES setting stabilization procedure ends, it is confirmed whether or not there is a problem with the AP 220 and/or the coaxial cable 600. When there is no problem with the AP 220 and/or the coaxial cable 600, it is possible to solve a problem of failing in displaying the HUD image by changing the image output enabled/disabled setting state from image output disabled (Video Visible: False) to image output enabled (Video Visible: True). The AP 220 continuously monitors the image output enabled/disabled setting state, and changes the image output enabled/disabled setting state to image output enabled (Video Visible: True) when the image output enabled/disabled setting state is image output disabled (Video Visible: False) in a HUD operation state.

Figure 7:
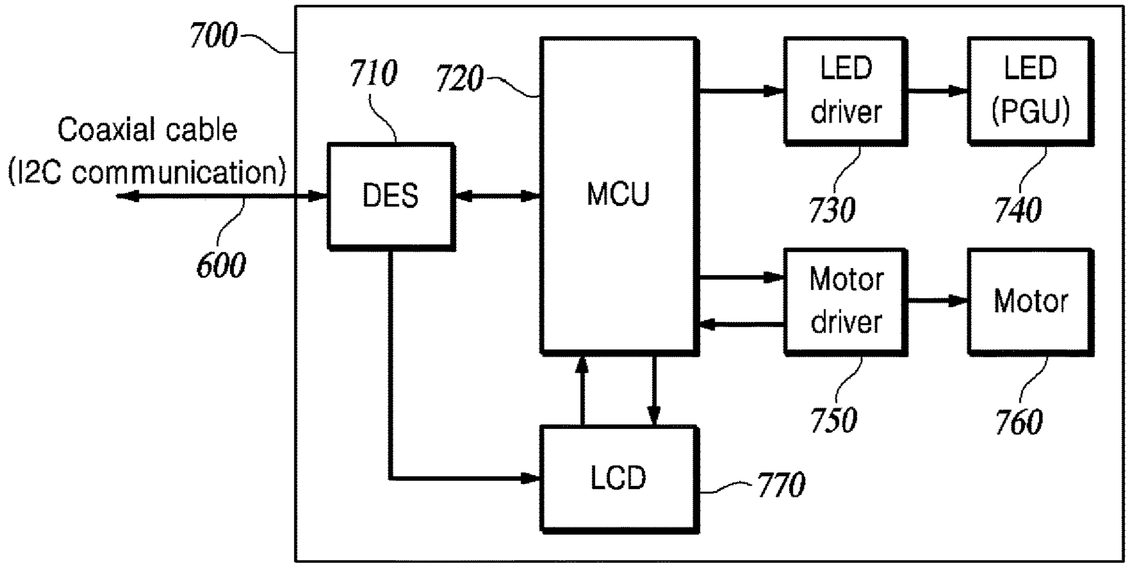
FIG. 7 is a configuration diagram illustrating each component of a slave according to an embodiment of the present disclosure.

FIG. 7 illustrates a more detailed exemplary configuration of the slave 700. As illustrated in FIG. 7, the slave 700 includes a DES (DESerializer) 710, a microcomputer (720), an LED driver 730, an LED 740, a motor driver 750, a motor 760, and an LCD 770.

The DES 710 is a deserializer that converts serial data transmitted from the master 200 through the coaxial cable 600 into parallel data.

The microcomputer 720 is a central processing unit that controls each component of the slave 700. The microcomputer 720 is connected to the DES 710, receives and processes a request from the master 200, and transmits a control command to each component. The request transmitted from the master 200 may include a request to adjust the height of the HUD image, a request to turn on/off the LCD, a communication response request, and the like.

The LED 740 is a light source for generating the HUD image to be displayed on the windshield of the vehicle, and corresponds to a Picture Generation Unit (PGU) of the HUD system.

The LED driver 730 drives on/off of each of pixels constituting the LED 740 (or opens and closes a shutter of each pixel) on the basis of a display area and position information of the HUD image to be displayed on the windshield under the control of the microcomputer 720.

The motor 760 is connected to a mirror (not illustrated in the configuration diagram of FIG. 7) that reflects the HUD image generated by the LED 740. When the motor 760 rotates, an angle of the mirror is adjusted so that the height of the HUD image displayed on the windshield is adjusted.

The motor driver 750 drives the motor 760 on the basis of height information of the HUD image to be displayed on the windshield under the control of the microcomputer 720.

The LCD 770 displays the image processed and output by the AP 220 of the master 200. Backlight generated by the LED 740 is projected onto the image of the LCD 770 so that a HUD image to be displayed on the windshield is generated.

Hereinafter, embodiments regarding (1) HUD image height control and (2) backlight control of the slave 700 will be disclosed.

FIG. 8*a* is a diagram illustrating a right side of the vehicle in which the HUD system according to an embodiment of the present disclosure is installed. An eye-box 810 is a virtual area formed so that the HUD image is viewed. A windshield 830 is a windshield of the vehicle, and a HUD system 820 according to an embodiment of the present disclosure is installed below the windshield 830. A display image 840 refers to a virtual image formed by an image generated by the HUD system 820 being reflected on the windshield 830.

The HUD system 820 adjusts a position of the eye-box 810 so that contents can be displayed at an appropriate position according to an eye level difference of the driver. The eye-box 810 can be divided into a plurality of steps in consideration of the eye level of the driver, and it is assumed that the eye-box 810 is divided into 20 steps in the present embodiment. Each step of the eye-box is determined according to an operation of the motor 760, and accordingly, display areas 841*a* to 843*a* of the display image 840 may be changed.

FIG. 8*b* illustrates display areas 841*b* to 843*b* of the HUD image perceived by the driver corresponding to the display areas 841*a* to 843*a* illustrated in FIG. 8*a*. In step 1, the display area 841*b* of the HUD image perceived by the driver is located too low, and in step 20, the display area 843*b* of the HUD image perceived by the driver is located too high, making it difficult for the driver to view the HUD image. Accordingly, the initial reference position of the motor is set so that the display image 840 is initially formed in appropriate areas 842*a* and 842*b* when power is applied to the slave 700. In the present embodiment, it is assumed that step 10 is a preferred initial reference position of the motor 760.

In a process in which an operation of setting the initial reference position of the motor 760 (ZPD; Zero Point Detection) is performed, when the ZPD operation is not completed due to the motor being locked, the motor is located lower than the reference position. This problem may occur when an abnormality occurs in the ZPD switch contact point due to freezing. Alternatively, even when the ZPD operation is completed, the motor may be located higher or lower than the reference position due to a m is-setting of a motor movement amount.

When there is a request to adjust the HUD image height from the master 200, the slave 700 drives the motor 760 according to the request, and responds to the master 200 with any one of a moving state, a stopped state during movement, a movement completion state, and a movement amount excess state. When the master 200 receives the response with the stopped state during movement or the movement amount excess state, the master 200 requests the slave 700 to initialize the position of the motor 760 when the time is before a first image output. Since a first image is output within 4.2 seconds after power is applied and the slave is booted within 500 ms after power is applied, the initialization request of the master 200 can be performed up to about five times. When the malfunction of the motor exceeds five times, a failure is recorded and the driver is notified that the slave 700 needs to be replaced.

For reference, the example in which the motor connected to the mirror is rotated so that an eye-box step is adjusted has been described in the present embodiment, but the technical scope of the present disclosure is not limited thereto and various methods and devices are both included as long as these adjust the eye-box step.

Hereinafter, an embodiment regarding control of the backlight projected onto an image of the LCD 770 by a configuration of the LED 740 of the slave 700 will be disclosed. The problem of failing in displaying the HUD image may also occur when a problem occurs in the slave motor control as well as the slave backlight control. Even though the master 200 requests the slave 700 to turn on the backlight of the LED 740, the HUD image is not displayed when the slave 700 performs a turn-off operation. On the other hand, even when the master 200 requests to turn off the backlight, only a white image is displayed when the slave 700 performs a turn-on operation.

When the master 200 requests to turn on/off the backlight, the slave 700 responds with whether the backlight is turned on/off, and the master 200 checks a backlight state from the response of the slave 700 and requests to turn on/off repeatedly. When the master 200 detects that the backlight driving element (driver IC) is disabled, the master records the failure and notifies the OBD via the DTC so that the driver is notified that the slave needs to be replaced.

The respective components of the device or method according to the present invention may be implemented by hardware or software, or may be implemented by a combination of the hardware and the software. Further, a function of each component may be implemented by software and a microprocessor may be implemented to execute the function of the software corresponding to each component.

Various implementation examples of the systems and techniques described herein may be realized by a digital electronic circuit, an integrated circuit, an FPGA (field programmable gate array), an ASIC (application specific integrated circuit), computer hardware, firmware, software, and/or a combination thereof. These various implementation examples may be implemented by one or more computer programs executable on a programmable system. The programmable system includes at least one programmable processor (which may be a special purpose processor or may be a general purpose processor) connected to receive data and instructions from a storage system, at least one input device, and at least one output device and transfer data and instructions to these. The computer programs (also known as programs, software, software applications, or code) include instructions for the programmable processor and are stored in a "computer-readable recording medium".

The computer-readable recording medium includes any type of recording devices in which data that can be read by a computer system is stored. The computer-readable recording medium may be a non-volatile or non-transitory medium, such as a ROM, a CD-ROM, a magnetic tape, a floppy disk, a memory card, a hard disk, a magneto-optical disc, and a storage device, and may further include a transitory medium such as a data transmission medium. Further, the computer-readable recording medium may be distributed in network-connected computer systems, and computer-readable code may be stored and executed in a distributed manner.

Although a case in which respective processes are sequentially executed in the flowchart and timing diagram in the present specification has been described, this is merely illustrative of the technical spirit of the embodiment of the present disclosure. In other words, since various changes and modifications can be made by those skilled in the art to which the embodiment of the present disclosure pertains by executing the respective processes in order other than those described in the flowchart and timing diagram or executing one or more of the respective processes in parallel without departing from essential characteristics of the embodiment of the present disclosure, the flowchart and timing diagram is not limited to a time-series order.

What is claimed is:

1. A HUD system comprising:

a master configured to generate a backlight turn-on or turn-off signal for generating a HUD image and transmitting the turn-on or turn-off signal;

a slave configured to receive the turn-on or turn-off signal from the master and provide the backlight by driving an LED according to the turn-on or turn-off signal; and a connection device configured to connect the master to the slave, wherein:

the slave is configured to drive the LED when receiving a request to turn on or turn off the backlight, and respond to the master through reflection of a turn-on or turn-off state of the LED to notify the master of the backlight state, wherein the request to turn on or turn off the backlight from the master is repeatedly performed a preset number of times, the master is configured to confirm the backlight state, and request the slave to turn on or turn off when the backlight state does not match the backlight turn-on or turn-off signal, the slave is configured to respond to the master through reflection of whether or not an LED driver fails to notify the master of a state of the LED driver when a mismatch between the backlight state and the backlight turn-on or turn-off signal exceeds the preset number of times, and the master is configured to record a failure and notifies a driver that the slave needs to be replaced when the failure of the LED driver is confirmed.

2. The HUD system of claim 1, wherein the master comprises:

a micro controller unit (MCU) configured to generate transmission data including information on SERializer/DESerializer (SER/DES) settings;

a transmission and reception buffer configured to buffer the transmission data;

an SER configured to reconstruct parallel data output from the transmission and reception buffer into serial data and transmit the serial data to the slave; and an interrupt controller including interrupt service routine (ISR) information, wherein the master is configured to confirm whether original data regarding the SER/DES setting of the MCU matches the output data of the transmission and reception buffer when the transmission of the transmission and reception buffer is completed, set an ISR having a higher priority than I2C to disable when pieces of data do not match, retransmit data regarding the SER/DES setting, and set the ISR to enable when the retransmission is completed.

3. The HUD system of claim 2, wherein the master is configured to repeatedly perform retransmission until the original data matches the output data a preset number of times within a limit of a point in time at which a HUD image is first output after power is applied to the HUD system, and stop the retransmission and processes next data when mismatch between the pieces of data exceeds the preset number of times.

4. The HUD system of claim 1, wherein:

the master comprises a micro controller unit (MCU) configured to generate transmission data including information on SERializer/DESerializer (SER/DES) settings; and a SER configured to reconstruct parallel data output from the MCU into serial data and transmit the serial data to the slave, the slave comprises a DES configured to reconstruct the serial data received from the master into the parallel data, and the master is configured to check whether the connection device is physically connected, record a failure and notify a driver of the failure when the connection device is not normally connected, check a presence or absence of an I2C communication error, including confirming arbitration and bit Error in a communication data frame, when the connection device is normally connected, and perform SER/DES setting error handling for initializing an I2C peripheral device and performing an SER/DES setting from a beginning when an I2C communication error is detected for a preset period of time or more.

5. The HUD system of claim 4, wherein the master is configured to repeatedly perform the SER/DES setting error handling until a communication error is not detected within a limit of a point in time at which a HUD image is first output after power is applied to the HUD system, and initialize the SER, perform the SER/DES setting from the beginning, and end the SER/DES setting error handling when the communication error is detected a preset number of times or more.

6. The HUD system of claim 4, wherein the master is configured to check whether the DES setting data of the master matches the DES setting of the slave when the SER/DES setting error handling is ended, and record a failure and notifies the driver of the failure when the DES setting data of the master does not match the DES setting of the slave.

7. The HUD system of claim 4, wherein:

the master comprises an application processor (AP) configured to control whether or not to output an image according to an image recognizable state (video visible) setting, the master is configured to continuously monitor an image output enabled/disabled (Video Visible: True/False) setting state of the AP, and the AP is adapted to change the image output enabled/disabled state from image output disabled (Video Visible: False) to image output disabled (Video Visible:

True) when an abnormality occurs in the I2C communication but there is no problem with the AP and the connection device.

8. An image display stabilization method of a function-separated HUD system, the method comprising:

transmitting, by a master, a request to turn on or turn off a backlight for a HUD image display;

turning on or off, by a slave, an LED providing the backlight through an LED driver when receiving the request;

responding, by the slave, to the master through reflection of an on or off state of the LED to notify the master of a backlight state; and requesting, by the master, the slave to turn on or off when the backlight state does not match the request to turn on or off the backlight, wherein the requesting, by the master, the slave to turn on or turn off the backlight is repeatedly performed a preset number of times, and comprises:

responding, by the slave, to the master through reflection of whether or not an LED driver fails to notify the master of a state of the LED driver when a mismatch between the backlight state and backlight turn-on or turn-off signal exceeds the preset number of times, and recording, by the master, a failure and notifying a driver that the slave needs to be replaced when the failure of the LED driver is confirmed.

9. The method of claim 8, further comprising:

confirming, by the master, whether output data of a transmission and reception buffer has been transmitted;

confirming whether original data regarding SER/DES setting matches the output data when the transmission of the output data is completed;

setting an interrupt service routine (ISR) having a higher priority than I2C to disable and retransmitting data regarding the SER/DES setting when the original data does not match the output data; and setting the ISR to enable when the retransmitting is completed.

10. The method of claim 9, wherein:

the retransmitting is repeatedly performed a preset number of times until the original data matches the output data within a limit of a point in time at which a HUD image is first output after power is applied to the HUD system, and comprises stopping the retransmitting and processing next data when mismatch between the original data and the output data exceeds the preset number of times.

11. The method of claim 8, further comprising steps of:

checking, by the master, whether a connection device connecting the master to the slave is physically connected, recording a failure and notifying the driver of the failure when the connection device is not normally connected;

checking a presence or absence of an I2C communication error, including confirming arbitration and bit Error in a communication data frame to prevent incorrect SER/DES setting data, when the connection device is normally connected; and initializing an I2C peripheral device and performing an SER/DES setting from a beginning when an I2C communication error is detected for a preset period of time or more.

12. The method of claim 11, wherein:

checking whether there is an I2C communication error is repeatedly performed until a communication error is not detected within a limit of a point in time at which a HUD image is first output after power is applied to the HUD system, and comprises initializing the SER, performing the SER/DES setting from the beginning, and ending SER/DES setting error handling when the communication error is detected a preset number of times or more.

13. The method of claim 11, further comprising:

checking whether the DES setting data of the master matches the DES setting of the slave, and recording a failure and notifying the driver of the failure when the DES setting data of the master does not match the DES setting of the slave.

14. The method of claim 11, further comprising:

continuously monitoring, by the master, an image output enabled/disabled (Video Visible: True/False) setting state of an application processor (AP), and changing, by the AP, the image output enabled/disabled state from image output disabled (Video Visible: False) to image output disabled (Video Visible: True) when an abnormality occurs in the I2C communication but there is no problem with the AP and the connection device.

* * * * *